US009992721B2

(12) United States Patent
Chan et al.

(10) Patent No.: US 9,992,721 B2
(45) Date of Patent: Jun. 5, 2018

(54) SYSTEM AND METHOD FOR DISTRIBUTED MOBILITY MANAGEMENT WITH GPRS TUNNELING PROTOCOL

(71) Applicant: Futurewei Technologies, Inc., Plano, TX (US)

(72) Inventors: Hinghung Anthony Chan, Plano, TX (US); Kaippallimalil Mathew John, Richardson, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 477 days.

(21) Appl. No.: 14/581,407

(22) Filed: Dec. 23, 2014

(65) Prior Publication Data

US 2015/0189563 A1   Jul. 2, 2015

Related U.S. Application Data

(60) Provisional application No. 61/921,290, filed on Dec. 27, 2013.

(51) Int. Cl.
*H04W 36/12* (2009.01)
*H04W 40/36* (2009.01)
(Continued)

(52) U.S. Cl.
CPC ....... *H04W 36/12* (2013.01); *H04W 36/0016* (2013.01); *H04W 36/08* (2013.01);
(Continued)

(58) Field of Classification Search
CPC ..... H04W 36/0016; H04W 36/0033–36/0044; H04W 36/04; H04W 36/08; H04W 36/10;
(Continued)

(56) References Cited

U.S. PATENT DOCUMENTS

| 2011/0075675 A1 | 3/2011 | Koodli et al. |
| 2012/0099578 A1* | 4/2012 | Aramoto .......... H04W 8/02 370/338 |

(Continued)

FOREIGN PATENT DOCUMENTS

| JP | 2012147366 A | 8/2012 |
| WO | WO 2012/135793 A2 | 10/2012 |

(Continued)

OTHER PUBLICATIONS

Ericsson: "SGW Selection by eNodeB FQDN," 3GPP TSG CT4 Meeting #51, C4-103047, Nov. 15-19, 2010, pp. 1-4, Jacksonvile, U.S.

(Continued)

*Primary Examiner* — Joshua Kading
(74) *Attorney, Agent, or Firm* — Slater Matsil, LLP (57) ABSTRACT

An apparatus is configured to perform a method for mobility management. The method includes establishing a first Packet Data Network (PDN) connection between a user equipment (UE) and a first Packet Data Network Gateway (PGW) associated with a first group of Serving Gateways (SGW) within a first geographical area; establishing communication with a handover destination SGW associated with a second PGW, the second PGW associated with a second group of SGWs within a second geographical area; and upon a determination that the UE moves from the first geographical area to the second geographical area, establishing a General Packet Radio Service (GPRS) Tunneling Protocol (GTP) tunnel connection between the first PGW and the handover destination SGW, and updating the first PDN connection to use the GTP tunnel connection between the first PGW and the handover destination SGW.

17 Claims, 8 Drawing Sheets

(51) Int. Cl.
*H04W 76/06* (2009.01)
*H04W 76/04* (2009.01)
*H04W 36/08* (2009.01)
*H04W 36/00* (2009.01)
*H04W 36/16* (2009.01)
*H04W 76/02* (2009.01)

(52) U.S. Cl.
CPC ......... *H04W 40/36* (2013.01); *H04W 76/041* (2013.01); *H04W 76/066* (2013.01); *H04W 36/16* (2013.01); *H04W 76/022* (2013.01)

(58) Field of Classification Search
CPC ..... H04W 36/12; H04W 36/16–36/22; H04W 36/32; H04W 36/36; H04W 36/385; H04W 76/022; H04W 76/04; H04W 76/041; H04W 76/06; H04W 76/062; H04W 76/066; H04W 40/36
See application file for complete search history.

(56) References Cited

U.S. PATENT DOCUMENTS

| | | |
|---|---|---|
| 2014/0219188 A1 | 8/2014 | Bertin et al. |
| 2014/0226646 A1 | 8/2014 | Nishigori et al. |
| 2015/0138989 A1* | 5/2015 | Polehn .................. H04W 24/02 370/241 |
| 2015/0156660 A1* | 6/2015 | Luo .......................... H04W 8/02 370/230 |
| 2015/0296424 A1* | 10/2015 | Xu .................... H04W 36/0033 370/331 |
| 2016/0212773 A1* | 7/2016 | Kanderholm ......... H04W 28/08 |

FOREIGN PATENT DOCUMENTS

| | | |
|---|---|---|
| WO | 2012175896 A1 | 12/2012 |
| WO | 2013049137 A1 | 4/2013 |
| WO | WO 2013/047772 A1 | 4/2013 |
| WO | WO 2013/049137 A1 | 4/2013 |
| WO | 2013075755 A1 | 5/2013 |

OTHER PUBLICATIONS

Ericsson: "Pseudo-CR on PGW Node Selection Based on DNS," 3GPP TSG CT WG4 Meeting #38bis, C4-080816, Apr. 7-11, 2008, pp. 1-14, Jeju Island, Korea.

CISCO: "Selected IP Traffic Offload for LTE at S1," 3GPP TSG SA WG2 Meeting #77, TD S2-100771, Jan. 18-22, 2010, pp. 1-7, Shenzhen, China.

Huawei: "Connection Management for SIPTO Macro Mobility," 3GPP TSG SA WG2 Meeting #80, TD S2-103492, Aug. 30-Sep. 3, 2010, pp. 1-3, Brunstadt, Norway.

Intel, et al., "CSIPTO for IMS," 3GPP TSG-SA WG1 Meeting #64, S1-135215, San Francisco, USA, Nov. 11-15, 2013, 4 pages.

* cited by examiner

SYSTEM AND METHOD FOR DISTRIBUTED MOBILITY MANAGEMENT WITH GPRS TUNNELING PROTOCOL

CROSS-REFERENCE TO RELATED APPLICATION(S) AND CLAIM OF PRIORITY

This application claims priority under 35 U.S.C. § 119(e) to U.S. Provisional Patent Application No. 61/921,290, filed Dec. 27, 2013, entitled "DISTRIBUTED MOBILITY MANAGEMENT WITH GPRS TUNNELING PROTOCOL", which is hereby incorporated by reference into this application as if fully set forth herein.

TECHNICAL FIELD

The present disclosure relates generally to packet data network connections, and more particularly, to a system and method for distributed mobility management with a General Packet Radio Service (GPRS) tunneling protocol.

BACKGROUND

Wireless devices are becoming more diverse with not just billions of phones but also possibly a much larger number of sensors, machines contributing to machine-to-machine communication, and practical everything in the so-called Internet of Things (IoT). With an anticipated growth in several orders of magnitude of the number of these devices by the year 2020, dense radio networks may likely emerge. Both data and signaling from mobile devices are expected to grow exponentially over the next five or more years. However, localized data traffic patterns may dominate. A centralized architecture in mobile networks such as the Third Generation Partnership Project (3GPP) network to serve all the wireless nodes with a centralized core network may not be efficient. Meanwhile, the Internet peering model is undergoing a transformation from a hierarchical model to a flatter one where tier 2 and tier 3 Internet Service Providers (ISPs) can connect directly with each other without having to always route packets between them via connections to tier 1 ISPs. The evolution from a centralized mobile core network towards a more distributed network is then a clear trend.

SUMMARY

This disclosure is directed to a system and method for distributed mobility management with a General Packet Radio Service (GPRS) tunneling protocol.

According to one embodiment, there is provided a method for mobility management. The method includes establishing a first Packet Data Network (PDN) connection between a user equipment (UE) and a first Packet Data Network Gateway (PGW) associated with a first group of Serving Gateways (SGW) within a first geographical area; establishing communication with a handover destination SGW associated with a second PGW, the second PGW associated with a second group of SGWs within a second geographical area; and upon a determination that the UE moves from the first geographical area to the second geographical area, establishing a General Packet Radio Service (GPRS) Tunneling Protocol (GTP) tunnel connection between the first PGW and the handover destination SGW, and updating the first PDN connection to use the GTP tunnel connection between the first PGW and the handover destination SGW.

According to another embodiment, there is provided an apparatus for mobility management. The apparatus includes a Mobility Management Entity (MME). The MME is configured to: establish a first PDN connection between a UE and a first PGW associated with a first group of SGWs within a first geographical area; establish communication with a handover destination SGW associated with a second PGW, the second PGW associated with a second group of SGWs within a second geographical area; and upon a determination that the UE moves from the first geographical area to the second geographical area, establish a GTP tunnel connection between the first PGW and the handover destination SGW, and update the first PDN connection to use the GTP tunnel connection between the first PGW and the handover destination SGW.

According to yet another embodiment, there is provided a system for mobility management. The system includes a first PGW associated with a first group of SGWs within a first geographical area, and a second PGW associated with a second group of SGWs within a second geographical area. The system also includes a MME configured to establish a first PDN connection between a UE and the first PGW; establish communication with a handover destination SGW associated with the second PGW; and upon a determination that the UE moves from the first geographical area to the second geographical area, establish a GTP tunnel connection between the first PGW and the handover destination SGW, and update the first PDN connection to use the GTP tunnel connection between the first PGW and the handover destination SGW.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The present disclosure provides a framework for distributed mobility management using a General Packet Radio Service (GPRS) Tunneling Protocol to provide mobility support from one provisional area to another by provisioning a Serving Gateway (SGW) in a colocated Packet Data Network Gateway (PGW) to support all eNBs in the new area while continuing the use of the previous PGW. When no sessions of the same Access Point Name (APN) are active using the old PGW, a new Packet Data Network (PDN) connection is set up in the new provisional area using a new PGW. When there are many SGWs in each provisional area, only one SGW in an entire provisional area needs to be specially provisioned to serve all the eNBs in that area while using the previous PGW. Using the colocated SGW at the PGW, there is no need to add a new SGW.

Figure 1:
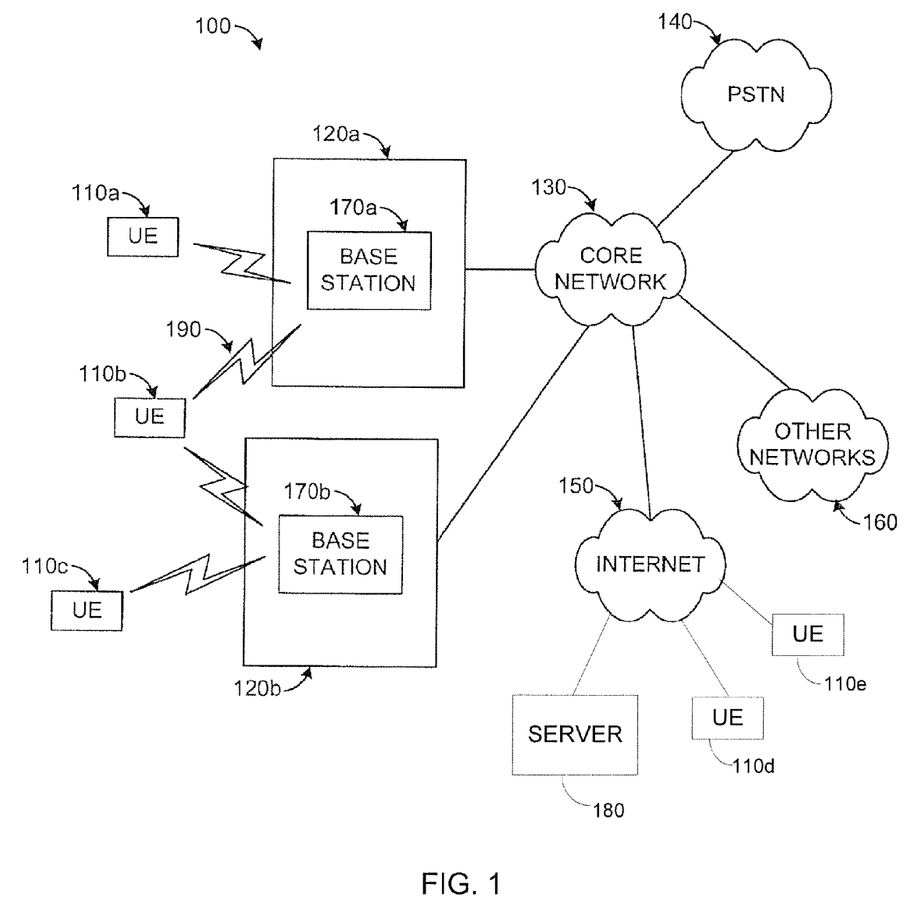
FIG. 1 illustrates an example communication system for distributed mobility management according to this disclosure.

FIG. 1 illustrates an example communication system 100 for distributed mobility management according to this disclosure. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA). In particular, the system 100 may be configured for communication in accordance with one or more Third Generation Partnership Project (3GPP) Evolved Packet Core (EPC) standards.

In this example, the communication system 100 includes user equipment (UE) 110a-110e, radio access networks (RANs) 120a-120b, a core network 130, a public switched telephone network (PSTN) 140, the Internet 150, and other networks 160, and one or more servers 180. While certain numbers of these components or elements are shown in FIG. 1, any number of these components or elements may be included in the system 100.

The UEs 110a-110e are configured to operate and/or communicate in the system 100. For example, the UEs 110a-110e are configured to transmit and/or receive via wireless or wired communication channels. Each UE 110a-110e represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device, all which include and incorporate a browser application.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. UEs 110d-110e are configured to interface and communicate with the internet 150 and may access the core network 130, the PSTN 140, and/or the other networks 160, which may include communicating with the server 180.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described below. In particular embodiments, the base stations and UEs may implement LTE, LTE-A, and/or LTE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols. Instead of wireless communication (or in addition thereto), the UEs may communicate via wired communication channels to a service provider or switch (not shown), and to the internet 150.

Although FIG. 1 illustrates one example of a communication system, various changes may be made to FIG. 1. For example, the communication system 100 could include any number of UEs, base stations, networks, or other components in any suitable configuration.

Figure 2A:
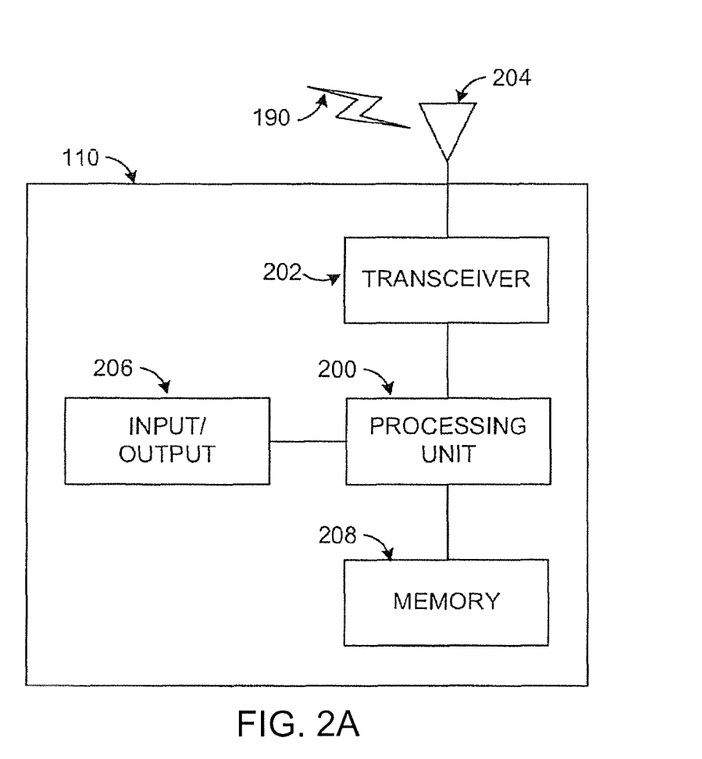
FIGS. 2A and 2B illustrate example devices that may implement the methods and teachings according to this disclosure.
Figure 2B:
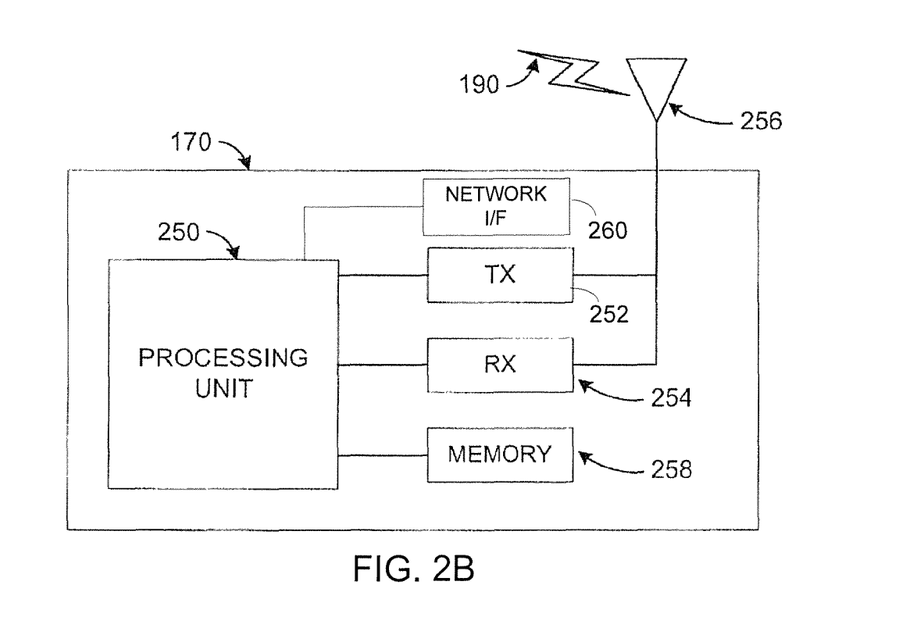

FIGS. 2A and 2B illustrate example devices that may implement the methods and teachings according to this disclosure. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, one or more wired network interfaces 260, and at least one memory 258. The processing unit 250 implements various processing operations of the server 180, such as signal coding, data processing, power control, input/output processing, or any other functionality. The processing unit 250 can also support the methods and teachings described in more detail below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and server 180 are known to those of skill in the art. As such, these details are omitted here for clarity.

Figure 3:
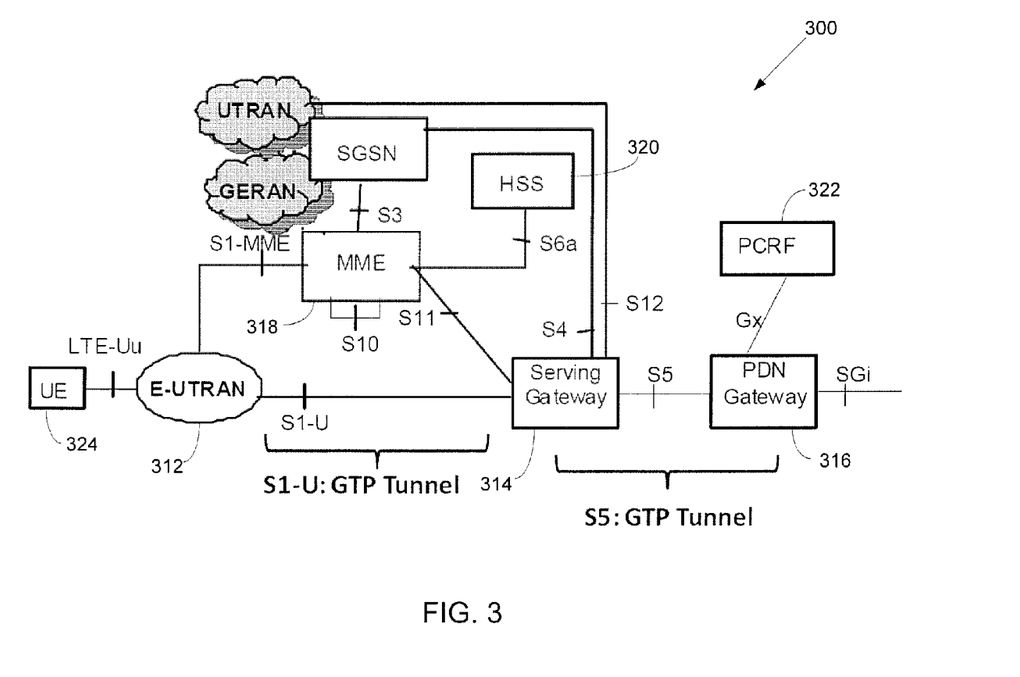
FIG. 3 illustrates a high level view of 3GPP Long Term Evolution (LTE)/Evolved Packet Core (EPC) architecture.

FIG. 3 illustrates a high level view of 3GPP Long Term Evolution (LTE)/EPC architecture 300 according to 3GPP 23.401. Various components of the architecture 300 may represent (or be represented by) one or more components of FIGS. 1, 2A, and 2B. For example, the UE 324 in FIG. 3 may represent one or more of the UEs 110 in FIG. 1.

The architecture 300 includes an Evolved-Universal Terrestrial Radio Network (E-UTRAN) 312 and an EPC mobile core network. The EPC provides a rich set of mechanisms for end user session and connection management. The EPC has a number of functional entities including the following: A Serving Gateway (SGW) 314 and a Packet Data Network Gateway (PGW) 316 in the data path; a Mobility Management Entity (MME) 318; a Home Subscriber System (HSS) 320; and a Packet Control and Rule Function (PCRF) block 322 that provides control plane functions. This architecture supports authentication and establishment of connections on demand, quality of service (QoS) policy and charging, mobility of established connections, and other session handling capabilities. In addition, the EPC also provides backward compatibility to the previous generation radio access networks (RAN): UMTS Terrestrial RAN (UTRAN) and GSM EDGE RAN (GERAN).

End-user connections are established when a User Equipment (UE) 324 attaches to a network with an Access Point Name (APN). The MME 318 facilitates signaling to establish the Packet Data Network (PDN) connection segments in the following: a S5 interface between the PGW 316 and the SGW 314, a S1-U interface between the eNB of E-UTRAN 312 and the SGW 314, and the radio interface LTE-Uu between the E-UTRAN 312 and the UE 324.

In the current LTE architecture, the GPRS Tunneling Protocol (GTP) is the most commonly used protocol for tunneling bearer connections. The mobility management in existing 3GPP EPC networks is centralized and uses primarily GTP for mobility. GTP connections from the eNB to the PGW 316 provide a stratified Layer 2 transport over which the UE's IP packets can be tunneled to the PGW 316 (first hop router for the UE). The GTP control protocol provides QoS policy negotiation capabilities, metering and accounting functions, UE location information, load information of the core network elements, keep alive and other connection information. Note that the EPC functional entities are an overlay on a UDP (User Datagram Protocol) over IP network which in turn is typically over a Multiprotocol Label Switching (MPLS) network. In the data plane, for example, the connection between the E-UTRAN 312 and the SGW 314, as well as that between the SGW 314 and the PGW 316, may be connected through several interne protocol (IP) and MPLS routers not shown in the figure.

Figure 4:
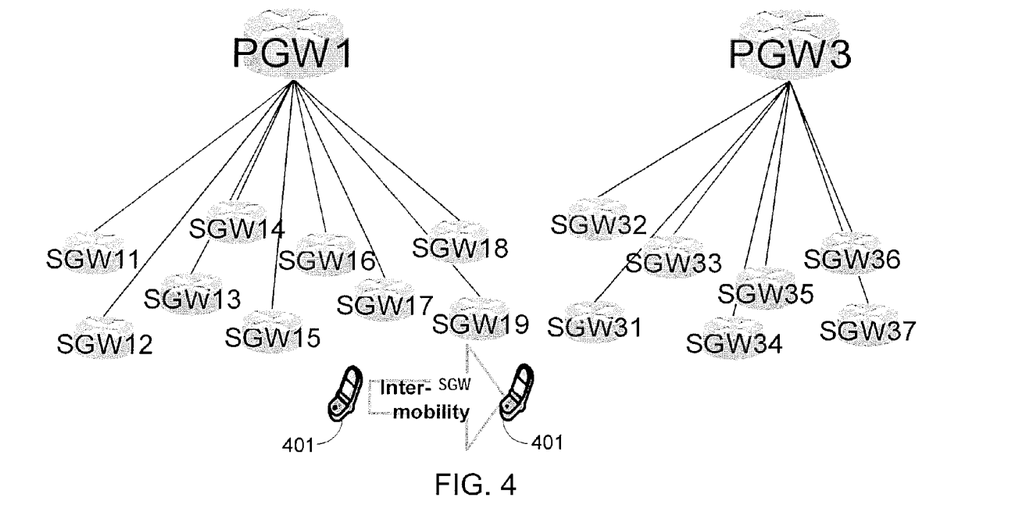
FIG. 4 illustrates an example handover within one group of SGWs using the same PGW.

FIG. 4 illustrates an example handover within one group of SGWs using the same PGW. As shown in FIG. 4, the IP flow for a Packet Data Network (PDN) connection created for a particular Access Point Name (APN) is anchored to a PGW, and packets are routed via this anchor. It is possible to provision a number of SGWs in one geographical area to use the PGW in that area (e.g., PGW1), whereas a number of other SGWs in another geographical area use the PGW in the other area (for a given APN) (e.g., PGW3). Such geographical areas are typically very large such that packet delays will be too long if the SGWs in different areas use the same PGW connecting to the same PDN for certain services. The separation to PGWs in different areas can avoid an excessively long tunnel between the SGW and PGW. In addition, network delays are shorter when the same services are available in multiple geographic locations. For example, cached servers having the same contents are available in different networks so that different PGWs can be used to access the same contents in different locations, each at a shorter packet delay. As the UE 401 moves (e.g., moves from a location associated with SGW15) and attaches to a different eNB, the Mobility Management Entity (MME) may choose a different SGW closer to the new eNB (e.g., SGW19). There the eNB and the SGW may change for that same IP flow, but the PGW may not change (e.g., the PGW remains PGW1).

Figure 5:
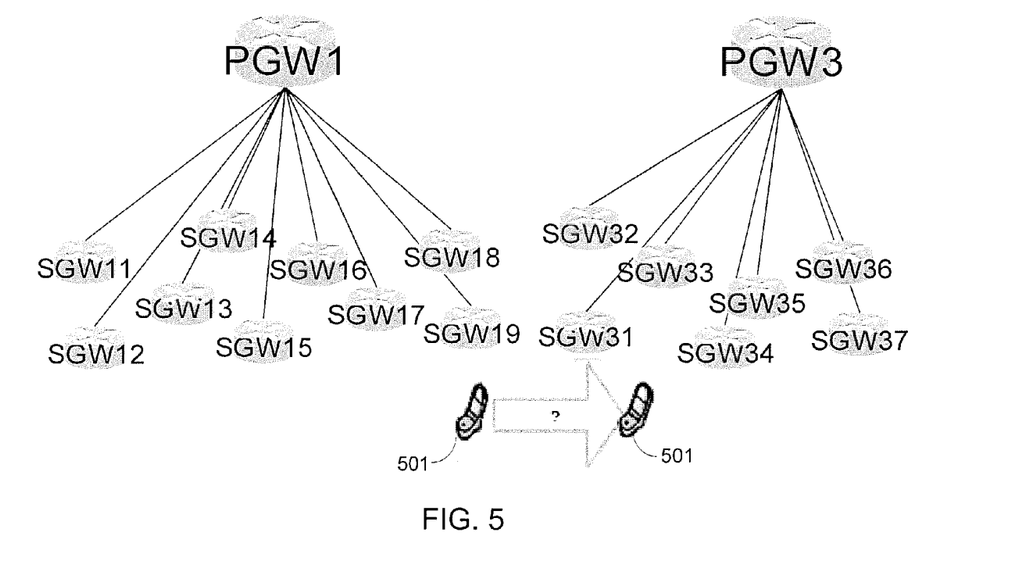
FIG. 5 illustrates an example handover to another group of SGWs.

FIG. 5 illustrates an example handover to another group of SGWs. As shown in FIG. 5, a UE 501 hands over from a first group of SGWs to a second group of SGWs. In most current networks, the geographical areas associated with each group of SGWs are so large that it is rare for a UE to move from one area to another area while running an application that requires session continuity after the handover. Thus, such handover situations, if they arise at all, typically involve only a relatively small number of individual handovers. However, if such handovers are not permitted, it is possible that communication sessions will break (and calls may be dropped) for such moves by the UE. While a solution to allow such handovers is needed, the cost to implement the solution should preferably be small since such moves do not occur often.

Figure 6:
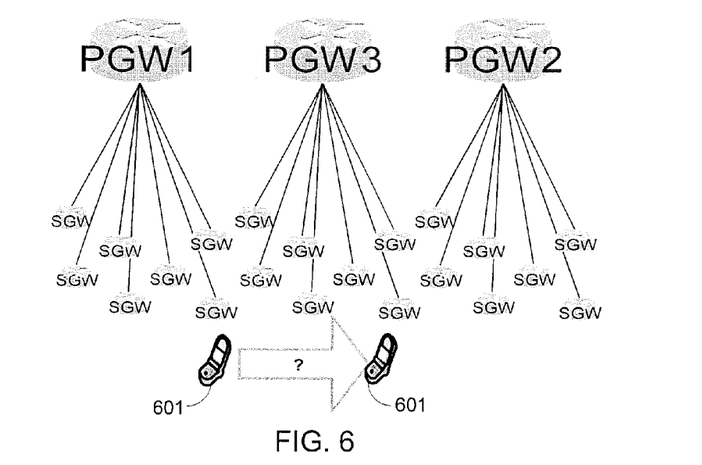
FIG. 6 illustrates an example handover to another SGW group in a denser network.

FIG. 6 illustrates an example handover to another SGW group in a denser network. As shown in FIG. 6, access networks in the future may be denser such that the area served by one SGW is smaller. For example, the SGWs in FIG. 6 are spaced closer together than the SGWs shown in FIGS. 4 and 5. As networks become denser and flatter, it is expected that the network services will become available in more locations which then become closer to the users. There can be more PGWs to access the same services. In that case, a UE (e.g., the UE 601) moving outside the area served by a group of SGWs using the same PGW may occur more frequently than in groups of SGWs that cover a larger geographical area.

To resolve the issue of more frequent inter-PGW handovers, embodiments of this disclosure provide a handover destination SGW at a convenient location in the latter geographical area so that the PDN connection using the previous PGW can use the provided SGW. This provided SGW (which can be referred to as a handover destination SGW) is chosen by the MME for those PDN connections which are using the PDN connection of the previous PGW while using the eNBs in the geographical area which normally would have used the new PGW. Use of the handover destination SGW to tunnel to the previous PGW also helps the PGW to distinguish such use as an interim solution. It prepares the system to eventually move to the new PGW in the latter geographical area when there is no more such interim-solution traffic.

Using the embodiments disclosed herein, it is possible to hand over to nodes outside the area that is normally served by a first PGW for a given PDN connection. The handover destination may be anywhere in that area of eNBs which otherwise would be served by the SGWs using a second (different) PGW for a new PDN connection. In some embodiments, the destination SGW is the SGW that colocates with the new PGW. Because the colocated SGW and PGW already exist in many networks, it is not necessary to add a separate SGW to use the existing colocated SGW functionality at the PGW. An example will now be described.

Figure 7A:
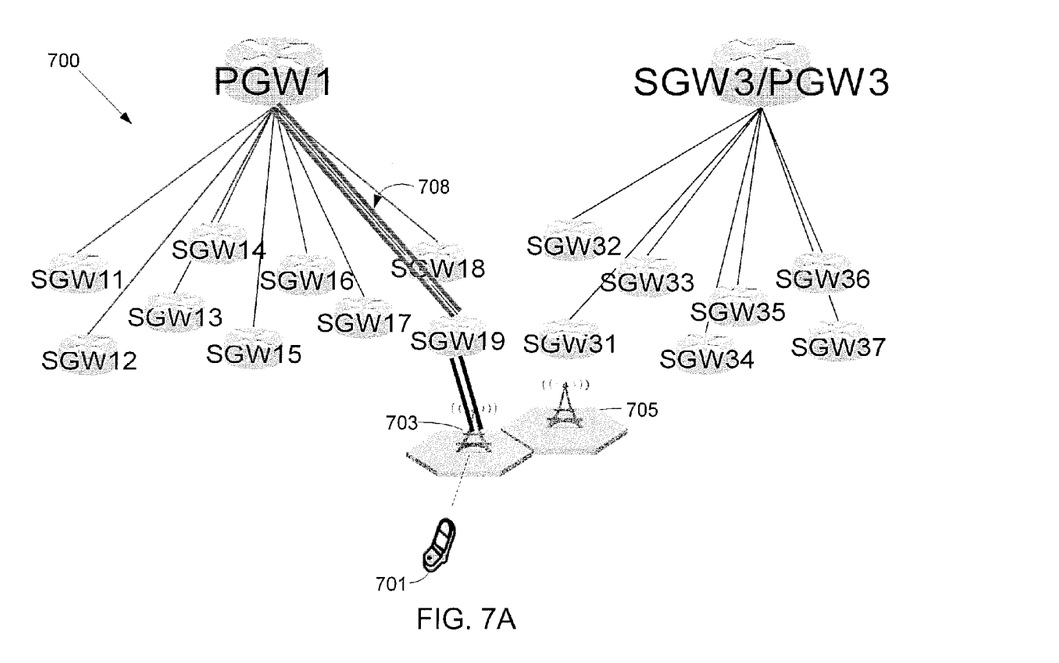
FIGS. 7A through 7C illustrate an example network that includes a handover destination SGW colocated with a PGW, according to this disclosure.
Figure 7B:
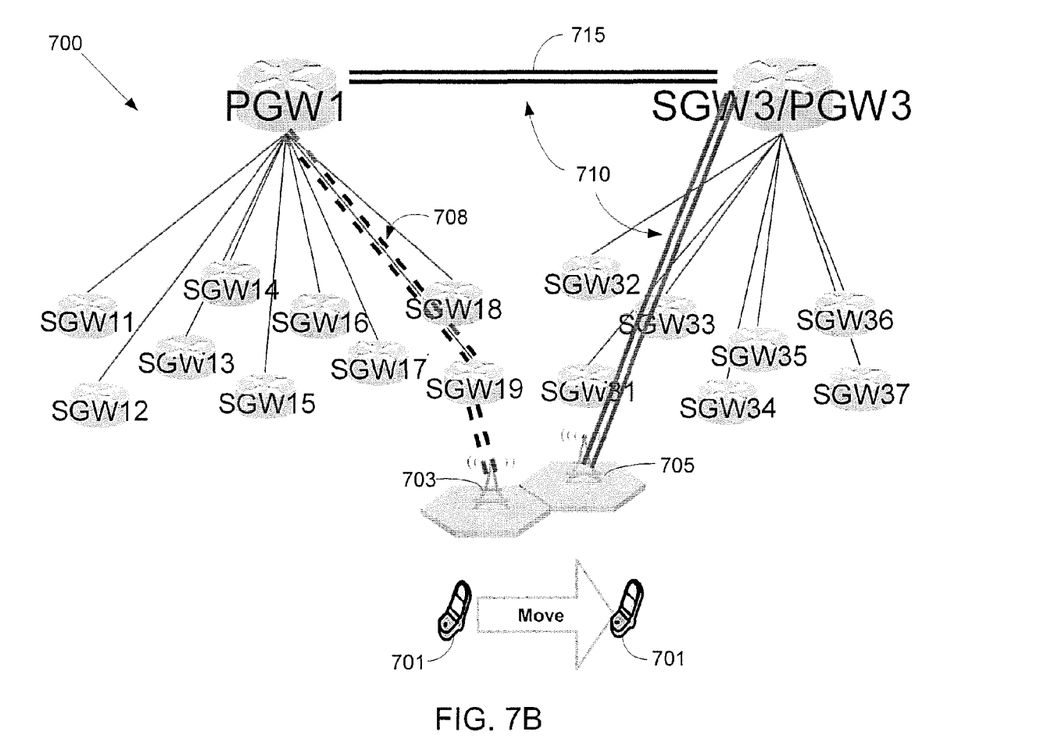
Figure 7C:
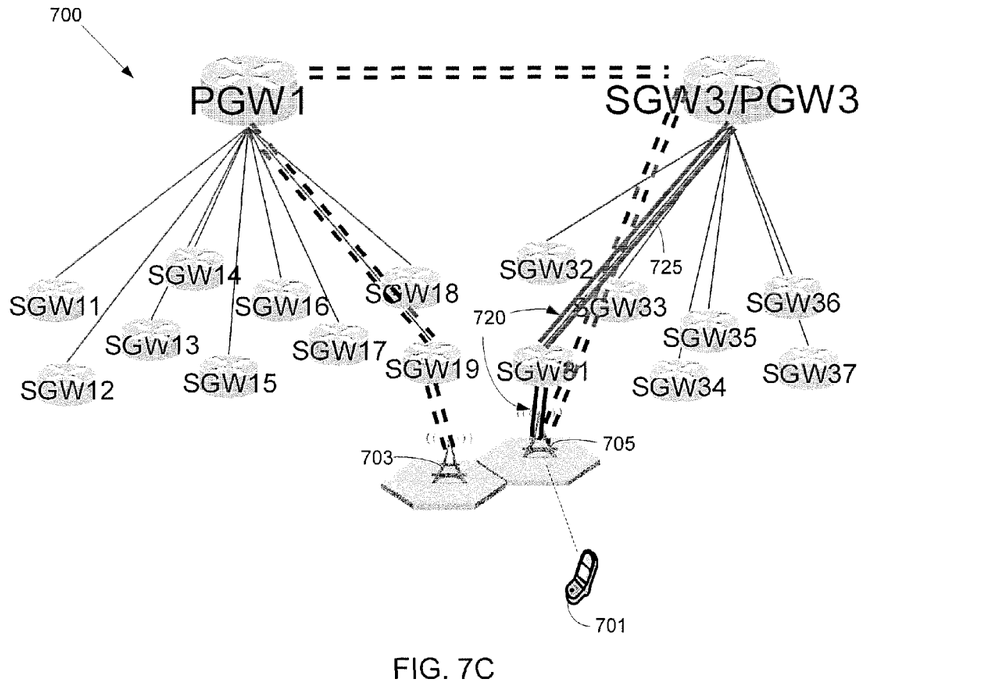

FIGS. 7A through 7C illustrate an example network that includes a handover destination SGW colocated with a PGW, according to this disclosure. Various components of the network 700 may represent (or be represented by) one or more components of FIGS. 1, 2A, 2B, and 3. For example, the UE 701 in FIGS. 7A-7C may represent one or more of the UEs 110 in FIG. 1.

As shown in FIG. 7A, a UE 701 is engaged in an ongoing communication session while inside a first geographical area served by one group of SGWs (SGW11-SGW19) using PGW1 for PDN connections to access the service from a Packet Data Network (PDN). Generally speaking, when the UE 701 attaches to an eNB in the network 700, the UE 701 requests for a PDN connection with an APN to indicate the PDN it wants to access. The MME picks a SGW, among the group of SGWs (SGW11-SGW19), which is close to the eNB of attachment. As the UE moves to different eNBs, the SGW may change to any SGW in the group SGW11-SGW19. In particular, in FIG. 7A, the UE 701 is in communication with an eNB 703 that is associated with SGW19. A PDN connection 708 for the UE 701 is established between PGW1, SGW19, and the UE 701, as indicated by the double line. A second group of SGWs (SGW31-SGW37) serves a second geographical area adjacent to the first geographical area. The second group of SGWs uses a different PGW, identified as PGW3, which is closer to these SGWs, to access the same PDN or another PDN with similar services. In the trend toward more dense networks and flattening the cellular network, providing services in multiple PDNs in different geographic locations helps to shorten delays.

The UE 701 initiates a handover to another eNB, and the eNB communicates with the MME. Before the handover, the MME had picked SGW19 and PGW (the current SGW and current PGW), and an application session had already been opened to communicate with another node. As shown in FIG. 7B, the UE 701 moves away from the service area of the eNB 703 to the second geographical area served by the second group of SGWs (SGW31-SGW37). In the second geographical area, the UE 701 discovers an eNB 705 which normally uses SGW31 as a local SGW and PGW3 as a closer PGW. Yet the MME recognizes that the PDN connection 710 is not using PGW3 but rather PGW1. Here the network 700 could have been provisioned to establish a GTP tunnel between PGW1 and SGW31 (as well as all other SGWs in the group SGW31-SGW39 to enable handover to this entire region); however, there are less provisioning and tunnels to manage in the dense network if they are separated into different regions. In addition, it will not enable change of PGWs even when the network becomes denser and services are more distributed so that multiple PDNs with different PGWs closer to them can provide the same services.

A handover-destination SGW, identified as SGW3, is provided at a convenient location in the second geographical area. In some embodiments, SGW3 is colocated with PGW3. Because the existing PDN connection 708 is using PGW1, the MME does not choose the local SGW31 (which is served by PGW3), but instead chooses colocated SGW3. PGW1 remains part of the PDN connection 710, and a GTP tunnel connection 715 between PGW1 and SGW3 is established, as indicated in FIG. 7B. That is, the existing PDN connection 708 using PGW1 is modified to now use SGW3, instead of establishing a new PDN connection with a new PGW. The PDN connection 710 then uses the eNB 705 (the new eNB), SGW3 (the handover-destination SGW), and PGW1 (the old PGW), as shown in FIG. 7B. The old PDN connection 708 (PGW1-SGW19-eNB 703) is torn down, and the session is handed over to the PDN connection 710.

The use of the tunnel 715, SGW3, and the PDN connection 710 helps PGW1 to distinguish such traffic as an interim use of PGW1 only. PGW1 can seek an opportunity to close the PDN connection 710 when there is no more active use of this PDN connection, so that a new PDN connection using a new PGW can be established.

The UE 701 can continue to move and handover to other eNBs under the entire area that would normally be served by the group of SGW31-SGW37. When the UE 701 tries to hand over to a different eNB (not shown in the figure), the new eNB contacts the MME. The MME determines that this is a special (interim use) PDN connection using SGW3. It will continue to configure the PDN to change only the eNB while keeping the existing SGW3 in the PDN connection. Alternatively, the new eNB and the old eNB may communicate directly to achieve this same handover without changing the SGW3 in the PDN connection.

If another session is set up now using the same APN, the new session will use the PDN connection 710. The PDN connection 710 continues to be used until there are no more active sessions. When no other session using the handed over PDN connection is active, the PDN connection 710 for this APN is closed. Then a new PDN connection 720 is set up as illustrated in FIG. 7C. There can be different ways to close the PDN connection. For example, one way for PGW1 to know that there are no more active sessions could be to use a timer so PGW1 can initiate closing the PDN connection.

The new PDN connection 720 is set up after the old PDN connection 710 has been closed. There can be different ways to open the new PDN connection. For example, a recovery mechanism may be in place when the eNB and/or the MME determine that an existing PDN connection has failed or that PGW1 has failed. It can use a recovery mechanism to initiate the setup of a new PDN connection using a different PGW.

To establish the new PDN connection 720, the UE 701 can send a request similar to when it attaches to the eNB 705. The eNB 705 contacts the MME with the new APN. The MME selects a new SGW that is close to the eNB 705, e.g., SGW31. SGW31 is configured to use PGW3 with this APN. The MME therefore selects PGW3 and establishes a GTP tunnel connection 725 between SGW31 (the new SGW) and PGW3 (the new PGW), as shown in FIG. 7C.

In some embodiments, after handover of the UE 701 to the second geographical area, the PDN connection 710 is initially deprecated, before being closed. The concept of deprecation is rooted in IP standards. Deprecation is a state between being active and being expired in IP. Again the use of SGW3 in the PDN connection 710 helps the PGW 1 or other network elements to distinguish such a deprecated connection from other active connections. Because the PDN is not active, it is then possible to open a new PDN connection. Once the new PDN connection 720 is established, a new session will use the new PDN connection. However, if an existing session is currently using the deprecated PDN connection 710, that session may continue to use the connection 710. Later, once the PDN connection 710 is closed, only the new PDN connection 720 is used.

The handover-destination SGW (e.g., SGW3) can be selected by the MME for those PDN connections that use the PDN connection of the PGW of the previous geographical area (e.g., PGW1) while using the eNBs in new geographical area which normally would use the new PGW (e.g., PGW3). Thus, it is possible to hand over to outside the area which is normally served by one PGW for a given PDN connection. The handover destination may now be anywhere in that area of eNBs that otherwise would be served by the SGWs using a different PGW for a new PDN connection.

Figure 8:
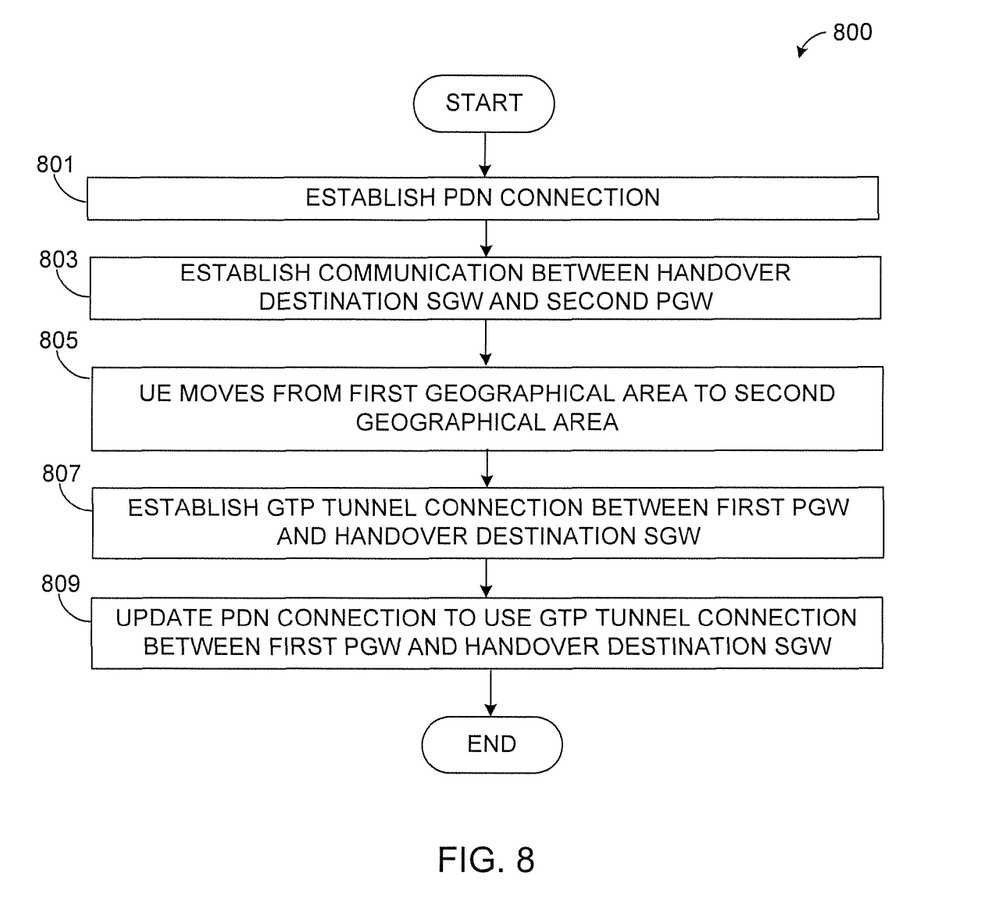
FIG. 8 illustrates an example method for mobility management using a handover destination SGW, according to this disclosure.

FIG. 8 illustrates an example method for mobility management using a handover destination SGW, according to this disclosure. For ease of explanation, the method 800 is described as being used with the network 700 of FIGS. 7A-7C. However, the method 800 could be used by any suitable device and in any suitable system or network.

At step 801, a PDN connection is established between a UE and a first PGW associated with a first group of SGWs within a first geographical area. For example, this may include a MME (e.g., the MME 318) establishing the PDN connection 708 between PGW1 and the UE 701.

At step 803, communication is established with a handover destination SGW associated with a second PGW. The second PGW is associated with a second group of SGWs within a second geographical area. This may include the MME establishing communication with SGW3, which is associated with PGW3. In some embodiments, SGW3 is colocated with PGW3.

At step 805, the UE moves from the first geographical area to the second geographical area. This may include the UE 701 moving from the geographical area associated with SGW1 1-SGW19 to the geographical area associated with SGW31-SGW37.

At step 807, after the UE moves from the first geographical area to the second geographical area, the MME establishes a GTP tunnel connection between the first PGW and the handover destination SGW. This may include the MME establishing the GTP tunnel connection 715 between PGW1 and SGW3.

At step 809, the MME updates the PDN connection to use the GTP tunnel connection between the first PGW and the handover destination SGW. This may include the MME updating the PDN connection 708 to the PDN connection 710 to use the GTP tunnel connection 715.

Although FIG. 8 illustrates one example of a method 800 for using a handover destination SGW colocated with a PGW, various changes may be made to FIG. 8. For example, while shown as a series of steps, various steps in FIG. 8 could overlap, occur in parallel, occur in a different order, or occur any number of times.

Figure 9:
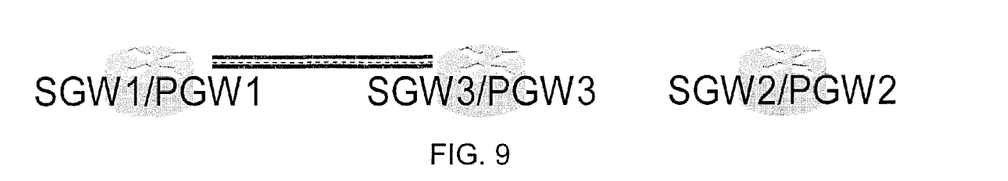
FIG. 9 illustrates another example network with colocated SGW/PGW pairs according to this disclosure.

By using the colocated SGW at each PGW, seamless handover is possible to practically everywhere within the network. The above-described method is also applicable when the network flattens, as shown in FIG. 9, where there are no longer separate groups of SGWs, and the colocated SGW/PGW pairs are used everywhere. The above-described method is applicable regardless of whether there are separate SGW-only boxes. The migration from the existing hierarchical network to the flattened network can then use the same mobility management mechanism.

The above embodiments are also applicable to other uses of GTP. For example, the above embodiments can be extended to 3GPP by implementing with SGSN and GGSN instead of SGW and PGW. Such a 3GPP system requires a colocated SGSN/GGSN.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for mobility management, the method comprising:
    establishing a first Packet Data Network (PDN) connection between a user equipment (UE) and a first Packet Data Network Gateway (PGW) associated with a first group of Serving Gateways (SGW) within a first geographical area, the first PDN connection including at least one SGW among the first group of SGWs;
    establishing communication with a handover destination SGW associated with a second PGW, the second PGW associated with a second group of SGWs within a second geographical area; and
    upon a determination that the UE moves from the first geographical area to the second geographical area, establishing a General Packet Radio Service (GPRS) Tunneling Protocol (GTP) tunnel connection between the first PGW and the handover destination SGW, and updating the first PDN connection to use the GTP tunnel connection between the first PGW and the handover destination SGW, the updated first PDN connection not including any SGWs in the first group of SGWs.

2. The method of claim 1, wherein the handover destination SGW is collocated with the second PGW.

3. The method of claim 1, wherein before the UE moves from the first geographical area to the second geographical area, the PDN connection includes a first eNB in the first geographical area, and after the UE moves from the first geographical area to the second geographical area, the PDN connection includes a second eNB in the second geographical area.

4. The method of claim 1, the method further comprising:
    receiving, before the UE moves from the first geographical area to the second geographical area, a PDN connection request from the UE.

5. The method of claim 1, the method further comprising, after the UE moves to the second geographical area:
    closing the first PDN connection; and
    establishing a second PDN connection between the second PGW, at least one SGW among the second group of SGWs, and the UE.

6. The method of claim 1, wherein the first geographical area is adjacent to the second geographical area.

7. A mobility management entity (MME) comprising:
    a
    a non-transitory memory storage comprising instructions; and
    one or more processors in communication with the memory storage, wherein the one or more processors execute the instructions to:
        establish a first Packet Data Network (PDN) connection between a user equipment (UE) and a first Packet Data Network Gateway (PGW) associated with a first group of Serving Gateways (SGW) within a first geographical area, the first PDN connection including at least one SGW among the first group of SGWs;
        establish communication with a handover destination SGW associated with a second PGW, the second PGW associated with a second group of SGWs within a second geographical area; and
        upon a determination that the UE moves from the first geographical area to the second geographical area, establish a General Packet Radio Service (GPRS) Tunneling Protocol (GTP) tunnel connection between the first PGW and the handover destination SGW, and update the first PDN connection to use the GTP tunnel connection between the first PGW and the handover destination SGW, the updated first PDN connection not including any SGWs in the first group of SGWs.

8. The MME of claim 7, wherein the handover destination SGW is collocated with the second PGW.

9. The MME of claim 7, wherein before the UE moves from the first geographical area to the second geographical area, the PDN connection includes a first eNB in the first geographical area, and after the UE moves from the first geographical area to the second geographical area, the PDN connection includes a second eNB in the second geographical area.

10. The MME of claim 7, wherein the one or more processors further execute the instructions to:
    receive, before the UE moves from the first geographical area to the second geographical area, a PDN connection request from the UE.

11. The MME of claim 7, wherein the one or more processors further execute the instructions to, after the UE moves to the second geographical area:
    close the first PDN connection; and
    establish a second PDN connection between the second PGW, at least one SGW among the second group of SGWs, and the UE.

12. The MME of claim 7, wherein the first geographical area is adjacent to the second geographical area.

13. A system for mobility management, the system comprising:
    a first Packet Data Network Gateway (PGW) device associated with a first group of Serving Gateways (SGW) within a first geographical area;
    a second PGW device associated with a second group of SGWs within a second geographical area;
    a Mobility Management Entity (MME) device communicatively coupled to the first and second PGWs, the MME configured to:
        establish a first Packet Data Network (PDN) connection between a user equipment (UE) and the first PGW, the first PDN connection including at least one SGW among the first group of SGWs;
        establish communication with a handover destination SGW associated with the second PGW; and
        upon a determination that the UE moves from the first geographical area to the second geographical area, establish a General Packet Radio Service (GPRS) Tunneling Protocol (GTP) tunnel connection between the first PGW and the handover destination SGW, and update the first PDN connection to use the GTP tunnel connection between the first PGW and the handover destination SGW, the updated first PDN connection not including any SGWs in the first group of SGWs.

14. The system of claim 13, wherein the handover destination SGW is collocated with the second PGW.

15. The system of claim 13, wherein before the UE moves from the first geographical area to the second geographical area, the PDN connection includes a first eNB in the first geographical area, and after the UE moves from the first geographical area to the second geographical area, the PDN connection includes a second eNB in the second geographical area.

16. The system of claim 13, wherein the MME is further configured to:
   receive, before the UE moves from the first geographical area to the second geographical area, a PDN connection request from the UE.

17. The system of claim 13, wherein the MME is further configured to, after the UE moves to the second geographical area:
   close the first PDN connection; and
   establish a second PDN connection between the second PGW, at least one SGW among the second group of SGWs, and the UE.

* * * * *

UNITED STATES PATENT AND TRADEMARK OFFICE
CERTIFICATE OF CORRECTION

PATENT NO. : 9,992,721 B2
APPLICATION NO. : 14/581407
DATED : June 5, 2018
INVENTOR(S) : Hinghung Anthony Chan Page 1 of 1

It is certified that error appears in the above-identified patent and that said Letters Patent is hereby corrected as shown below:

In the Claims

In Column 11, Line 58, Claim 7, delete "a".

Signed and Sealed this
Fourteenth Day of August, 2018

Andrei Iancu
*Director of the United States Patent and Trademark Office*